United States Patent [19]
Smith

[11] 3,819,137
[45] June 25, 1974

[54] TRESTLE FOR A FLEXIBLE HOSE

[76] Inventor: Harris L. Smith, 6109 Stratford, Huntsville, Ala. 35806

[22] Filed: Apr. 20, 1972

[21] Appl. No.: 245,973

[52] U.S. Cl.............. 248/49, 138/106, 248/76, 248/80, 248/83, 248/167, 248/436
[51] Int. Cl............................................. F16l 3/00
[58] Field of Search....... 248/49, 76, 276, 282, 371, 248/393, 394, 83, 85, 87, 92, 167, 436, 461, 435, 155, 155.1, 155.4, 77, 78, 80; 135/15 PQ; 138/103, 106, 108, 110; 137/615; 182/162

[56] References Cited
UNITED STATES PATENTS

| | | | |
|---|---|---|---|
| 504,241 | 8/1893 | Patton | 248/435 X |
| 793,151 | 6/1905 | Palmer | 248/436 X |
| 798,388 | 8/1905 | Bodendieck et al. | 182/162 |
| 1,100,823 | 6/1914 | Gordon | 182/162 X |
| 1,203,864 | 11/1916 | Engebretson | 248/461 |
| 1,422,319 | 7/1922 | Stoll | 248/435 X |
| 1,715,981 | 6/1929 | Blaw | 248/77 |
| 1,865,323 | 6/1932 | Liberman | 248/435 X |
| 3,572,622 | 3/1971 | Smith | 248/49 |

FOREIGN PATENTS OR APPLICATIONS

| | | | |
|---|---|---|---|
| 754,002 | 3/1967 | Canada | 248/49 |

*Primary Examiner*—Roy D. Frazier
*Assistant Examiner*—Rodney H. Bonck

[57] ABSTRACT

A trestle for a flexible hose such as a waste hose for recreational vehicles. The trestle includes a ladder having pivotal rungs enabling the ladder to collapse by moving the pole portions of the ladder together. In addition it includes adjustable means for elevating the ladder at one or both ends. The whole assembly is adapted to be stored when not in use within the flexible hose which it supports which in turn is adapted to be stored and transported within the hollow bumper of a recreational vehicle.

2 Claims, 4 Drawing Figures

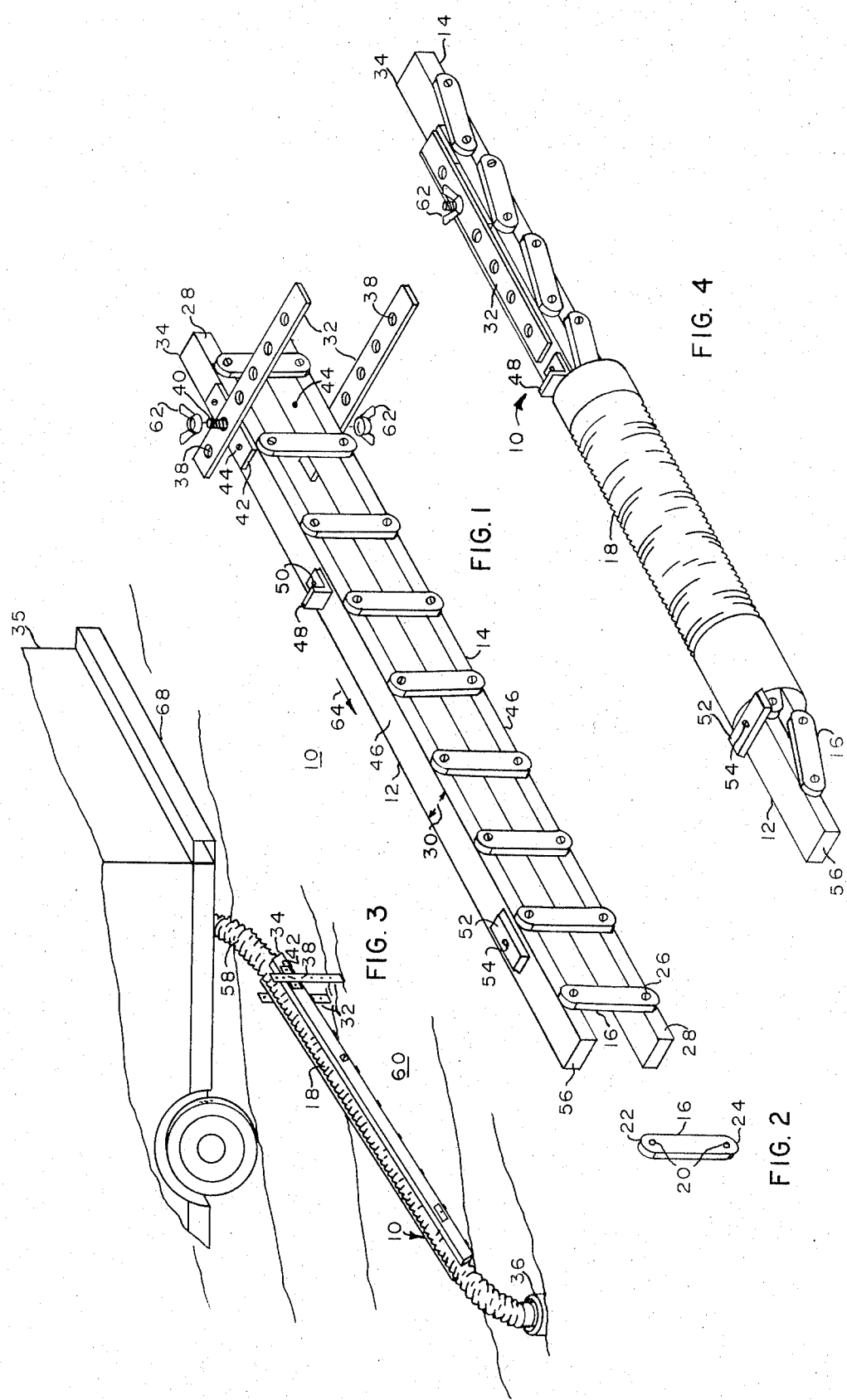

TRESTLE FOR A FLEXIBLE HOSE

BACKGROUND OF THE INVENTION

Recreational vehicles such as motorized homes, trailers and campers are usually equipped with toilets, showers, sinks and the like from which waste materials are discharged. Such vehicles have limited storage tanks for such waste and thus it is contemplated that waste lines from the vehicles be connected by a hose, typically a quite flexible hose, to a sewage head at a camping or trailer park.

Because of the unevenness of terrain often encountered it is often not a simple matter to readily connect the sewage hose from the sewage drain of the recreational vehicle to the sewage head provided at the camp site. Since storage is a particular problem with such vehicles the hoses are typically both flexible and collapsible so as to take up a minimum of space and typically are of such a length that they can be stored within a bumper of the vehicle. Being flexible of course poses a disadvantage in that the hose will follow the contour of the ground and in the event of a high place between the trailer and the sewage head the hose would be raised and possibly cause blockage of flow.

Support trestles of various types have been previously suggested but most of them are either too cumbersome, too expensive to manufacture or too difficult to erect, disassemble and store.

It is therefore the principal object of the present invention to provide an improved trestle for a flexible hose such as a waste hose for recreational vehicles which is readily assembled, convenient to use, readily disassembled, and storable in many instances within the same space occupied by the flexible hose.

BRIEF DESCRIPTION OF THE DRAWINGS

FIG. 1 is a perspective view of a hose supporting trestle as contemplated by the present invention.

FIG. 2 is a top view of one of the pivotal rungs from the trestle shown in FIG. 1.

FIG. 3 is a perspective view showing the trestle of the present invention positioned holding a flexible hose connected to a recreational vehicle as the invention would be used.

FIG. 4 is a perspective view of the invention folded with the flexible hose over it and in a position for storage within the bumper of a recreational vehicle.

DESCRIPTION OF THE PREFERRED EMBODIMENT

Referring to the drawings, FIG. 1 is a perspective view of an embodiment of sewage hose support 10 constructed in accordance with the present invention. The basic structure of hose support 10 comprises a pair of spaced elongate side rails 12 and 14 interconnected by a plurality of pivotally attached straps 16 to form a collapsible ladder-like trough, dimensioned to support a length of sewage hose 18. Side rails or supports 12 and 14 are preferably formed from rectangular stock of any one of a variety of materials such as light weight hollow metal extrusions, plastics, or wood. Lower trough support straps 16 are preferably formed of flat or tubular stock of the same variety of materials as side rails 12 and 14, and are provided with mounting apertures 20 near ends 22 and 24. Straps 16 are attached, by suitable metal or wood screw 26, or rivets, or other suitable fastening device, through apertures 20 to narrow edge or bottom surface 28, of side rails 12 and 14, being appropriately spaced to fully support sewage hose 18. The surface opposite surface 28 may be regarded as a top surface as the device is used. Mounting devices 26 are tightened sufficiently to provide a frictional engagement between straps 16 and side rails 12 and 14 in a manner as to support weight but allow for pivoting. Wider (height cross-sectional dimension) dimension 30 of side rails 12 and 14 provides a substantial lateral support for sewage hose 18. The width cross-sectional dimension of each rail is narrower, as shown. Surface 28 and its opposite surface are normal to wider or greater dimension 30. A pair of vertically disposed support members 32, preferably formed of metal straps or rods, enable the user to elevate one end 34, or both ends, of sewage hose support 10 to provide a desired decreasing elevation between discharge outlet, not shown, of trailer 35, and sewage inlet 36, FIG. 3. Support members 32 attach on the outside surface of each rail and are provided with a plurality of symmetrically spaced mounting holes 38 dimensioned to accept mounting bolt 40, centrally attached to elongated mounting straps 42. Mounting straps 42 are firmly secured by bolts 44, near end 34, to outer side 46 of side rails 12 and 14. When required a second set of support members 32 may be attached at the opposite end 56 of the trestle.

A fixed intermediate bracket 48 is secured by bolt 50 or some other type of fastening device to outer side 46 of side rail 12. Rotary latch 52 is secured in like manner by bolt 54 or some other type of fastening device near end 56 of side rail 12.

FIG. 3 illustrates how sewage hose support 10 is utilized to cradle sewage hose 18 and prevent depressions, where waste can collect. When hose 18 is connected to discharge outlet, not shown, on trailer 35, and routed to an available sewer connection 36, hose 18 is supported by hose support 10, oriented so that end 34 is adjacent trailer 35. End 34 of support 10 is then lifted to provide a suitable bend 58 in hose 18, and also sufficient increase in elevation, at trailer 35 so that fluid flows freely into sewer inlet 36. Vertical support members 32 are then installed to mounting straps 42 through one of selectable holes 38 to permanently maintain hose support 10 in this desired relationship with local terrain 60.

When necessary to use additional lengths of sewer hose, two or more hose supports 10 may be used end-to-end. Both ends 34 and 56 of one trestle are supported by support members 32, installed as described above. The second hose support 10 may be supported on one end only, or both if required by unevenness of terrain. Hose support 10 provides a maximum of convenience in storing and handling as illustrated in FIG. 4. As hose support 10 is removed from hose 18 in preparation for enroute storage, it is in a configuration as shown in FIG. 1. To prepare for storing, loosen nuts 62 which attach vertical straps 32, and rotate straps 32 into longitudinal alignment with side rails 12 and 14.

Restraining side rail 14, apply a longitudinal force to upper rail 12 as indicated by arrow 64. Hose support 10 collapses to form a convenient, slender package. To complete the preparation for storage, slide flexible hose 18 over end 56 of support 10 and compress against support bracket 48. Orient rotatable latch 52 perpendicular to side rail 12 and hose 18 is permanently stored, thus forming a unitized package for easy handling and storage, preferably inside bumper 68 of trailer 35.

It will thus be appreciated that the present invention provides an improved trestle for the support of a flexible sewer hose for recreational vehicles in that it readily provides a proper slant from trailer to sewage inlet; it enables the support of the hose over rough terrain; and it is easily constructed, easily erected and simply and conveniently stored.

What is claimed is:

1. A trestle for a flexible hose comprising:

a pair of elongated, substantially rigid, pole members each having one cross-sectional dimension greater than a dimension at right angles thereto, surfaces normal to said greater dimension being regarded as a top side and a bottom side, respectively, and surfaces normal to the narrow dimension being regarded as inside and outside surfaces, respectively;

a plurality of spaced cross members pivotally interconnecting said pole members by fixed pivotal connections, connections being made between bottom surfaces of said pole members, whereby a hose is provided substantial vertical support between ends of said trestle by said plurality of cross members and substantial lateral support is provided by said insides of said pole members; and adjustable elevation means comprising at least one pair of oppositely positioned legs attached to outside surfaces of said pole members and each being foldable along a said outside surface of said pole member; and means for securing a said hose on said trestle with said trestle extending through the hose when said trestle is in a collapsed condition.

2. A trestle as set forth in claim 1 wherein said means for securing said hose to said trestle comprises a bracket on one of said pole members adapted to restrain one end of a said hose and latching means spaced from said bracket and attached to one of said pole members for enabling a said hose to be passed over said latch when in an unlatched position and securing a said hose between said bracket and said latch when said latch is in a latched position.

* * * * *